(12) United States Patent
Nagai (10) Patent No.: US 10,427,472 B2
(45) Date of Patent: Oct. 1, 2019

(54) PNEUMATIC TIRE (71) Applicant: BRIDGESTONE CORPORATION, Chuo-ku, Tokyo (JP)

(72) Inventor: Toshiki Nagai, Nakano-ku (JP)

(73) Assignee: BRIDGESTONE CORPORATION, Tokyo (JP)

(*) Notice: Subject to any disclaimer, the term of this patent is extended or adjusted under 35 U.S.C. 154(b) by 314 days.

(21) Appl. No.: 14/390,142

(22) PCT Filed: Apr. 15, 2013

(86) PCT No.: PCT/JP2013/002545
§ 371 (c)(1),
(2) Date: Oct. 2, 2014

(87) PCT Pub. No.: WO2013/157241
PCT Pub. Date: Oct. 24, 2013

(65) Prior Publication Data
US 2015/0075694 A1  Mar. 19, 2015

(30) Foreign Application Priority Data
Apr. 18, 2012 (JP) ................... 2012-094991

(51) Int. Cl.
B60C 15/024 (2006.01)
B60C 15/06 (2006.01)
(Continued)

(52) U.S. Cl.
CPC ............... B60C 13/02 (2013.01); B60C 5/12 (2013.01); B60C 9/02 (2013.01); B60C 15/0242 (2013.01);
(Continued)

(58) Field of Classification Search
CPC ............ B60C 15/0242; B60C 15/0203; B60C 15/024; B60C 15/06; B60C 2015/0245; B60C 2015/061
(Continued)

(56) References Cited

FOREIGN PATENT DOCUMENTS

EP   2213484 A1 * 8/2010 ......... B60C 15/0027
JP   55091409 A  * 7/1980
(Continued)

OTHER PUBLICATIONS

Machine Translation: JP 2010143285 A; Nakamoto, Koki; no date.*
(Continued)

Primary Examiner — Robert C Dye
Assistant Examiner — Kendra Ly
(74) Attorney, Agent, or Firm — Sughrue Mion, PLLC (57) ABSTRACT A pneumatic tire, comprising: a carcass provided in a toroidal shape across a pair of bead cores; a bead filler provided on the outer side in the tire radial direction of each bead core; and a rim guard to protrude on the outer side in the tire width direction for rim protection, wherein a contour of a portion of the rim guard has radius of curvature in the range of 5 mm to 40 mm in a widthwise cross section of the tire, and provided that "1CSH" represents a distance in the tire radial direction between the innermost end and the outermost end of the carcass, a distance in the tire radial direction between the outermost end in the tire width direction of the rim guard and the outermost end in the tire radial direction of a bead filler is in the range of −0.2CSH to 0.05CSH.

5 Claims, 3 Drawing Sheets (51) Int. Cl.
    *B60C 15/00* (2006.01)
    *B60C 13/02* (2006.01)
    *B60C 5/12* (2006.01)
    *B60C 9/02* (2006.01)
    *B60C 19/00* (2006.01)

(52) U.S. Cl.
    CPC .............. *B60C 15/06* (2013.01); *B60C 19/00* (2013.01); *B60C 15/0603* (2013.01); *B60C 2015/061* (2013.01)

(58) Field of Classification Search
    USPC ........................................................ 152/544
    See application file for complete search history.

(56) References Cited

FOREIGN PATENT DOCUMENTS

| | | | | |
|---|---|---|---|---|
| JP | 04215508 | A | * | 8/1992 |
| JP | 4-252703 | A | | 9/1992 |
| JP | 11-78411 | A | | 3/1999 |
| JP | 11-268507 | A | | 10/1999 |
| JP | 11268507 | A | * | 10/1999 |
| JP | 2001-341506 | A | | 12/2001 |
| JP | 2002-12012 | A | | 1/2002 |
| JP | 2002012012 | A | * | 1/2002 |
| JP | 2003-326921 | A | | 11/2003 |
| JP | WO 2004080730 | A1 | * | 9/2004 ........... B60C 15/024 |
| JP | 2008247361 | A | * | 10/2008 |
| JP | 2010100252 | A | * | 5/2010 |
| JP | 2010-143285 | A | | 7/2010 |
| JP | 2010143285 | A | * | 7/2010 |
| JP | 2010-254243 | A | | 11/2010 |
| JP | 2010254243 | A | * | 11/2010 |
| JP | 2011084148 | A | * | 4/2011 |

OTHER PUBLICATIONS

Machine Translation: JP 2002012012 A; Yanagisawa, Manabu; no date.*
Machine Translation: JP 2010100252 A; Nakagawa, Ryuji; no date.*
Machine Translation: WO 2004080730 A1; Iida Hiroyuki; no date.*
Machine Translation: JP04215508A; Hanada, Ryoji (Year: 2018).*
Machine Translation: JP-11268507-A; Asano, Kazuo (Year: 2018).*
Machine Translation: JP-2008247361-A; Sumitomo, Kenta; (Year: 2018).*
Machine Translation: JP-2010254243-A; Osawa, Yasuo; (Year: 2018).*
Machine Translation: JP-2011084148-A; Kurita, Keiichi; (Year: 2018).*
Communication dated Jul. 14, 2015 from the Japanese Patent Office in counterpart application No. 2012-094991.
International Search Report of PCT/JP2013/002545, dated Jun. 11, 2013. [PCT/ISA/210].

* cited by examiner

PNEUMATIC TIRE

TECHNICAL FIELD

The present invention relates to a pneumatic tire and, in particular, a pneumatic tire having successfully reduced rolling resistance thereof, while ensuring a good effect of protecting a rim by a rim guard.

BACKGROUND ART

When a pneumatic tire assembled with a prescribed rim is mounted on a vehicle and used, there is a possibility that a part of the rim is brought into contact with a curbstone or a wall due to, for example, the vehicle approaching a shoulder edge of a road or the wall too close, which contact may possibly damage the rim. In order to prevent such a damage of a rim from occurring, there has been generally known a pneumatic tire having an annular rim guard provided on the outer side in the tire radial direction than a rim line to protrude on the outer side in the tire width direction and continuously extend in the tire circumferential direction.

Such a tire having a rim guard as described above can protect a rim thereof from a curbstone or the like and prevent the rim from being damaged because the rim guard is first brought into contact with a curbstone or the like when the tire approaches the curbstone or the like. A rim guard capable of functioning as described above is also sometimes referred to as a "rim protector" or the like.

There have been reports on studies of changing configurations and dimensions of a rim guard to improve performances of a pneumatic tire (e.g. refer to PTL 1 and PTL 2).

For example, PTL 1 discloses a pneumatic radial tire having a rim guard provided therein, wherein a contour of a radially outer side portion of the rim guard has radius of curvature in the range of 15 mm to 40 mm. PTL 1 reduces mass of the pneumatic radial tire thereof, while ensuring a good effect of protecting a rim by the rim guard, by setting radius of curvature of the aforementioned portion of the rim guard within the range described above.

CITATION LIST

Patent Literature

PTL 1: JP2002-012012
PTL 2: JP2003-326921

SUMMARY OF THE INVENTION

Technical Problems

However, the conventional pneumatic tire as described above has room for improvement in reduction of rolling resistance thereof because a pneumatic tire exhibiting good fuel efficiency has been demanded in terms of environment protection and energy saving in recent years.

In view of this, an object of the present invention is to provide a pneumatic tire having successfully reduced rolling resistance thereof, while ensuring a good effect of protecting a rim by a rim guard.

Solution to the Problems

The inventors of the present invention keenly studied a pneumatic tire in which a contour of a radially outer side portion of a rim guard has radius of curvature, in particular, measures for reducing rolling resistance of the tire with ensuring a good effect of protecting a rim by the rim guard. Specifically, the inventors of the present invention made an attempt to change in the tire radial direction a position of the outermost end in the tire radial direction of a bead filler.

In a case where a generally used rim guard having a relatively large volume, i.e. a rim guard where a contour of a radially outer side portion thereof has radius of curvature exceeding 40 mm, was employed and the outermost end in the tire radial direction of a bead filler was positioned on the outer side in the tire radial direction than the outermost end in the tire width direction of the rim guard, rolling resistance of the tire increased due to the occurrence of a phenomenon described below, as compared with a case where the outermost end in the tire radial direction of the bead filler was positioned on the inner side in the tire radial direction than the outermost end in the tire width direction of the rim guard.

When deformation force is exerted in the tire width direction on a tire, a rim guard is deformed from the outermost end position in the tire width direction thereof as a starting point. In the aforementioned case where the outermost end in the tire radial direction of a bead filler was positioned on the outer side in the tire radial direction than the outermost end in the tire width direction of the rim guard, deformation of the rim guard by deformation force exerted in the tire width direction was suppressed and thus hysteresis loss in the rim guard was suppressed. On the other hand, however, hysteresis loss in the bead filler increased because of an increase in volume of the bead filler generally having relatively high loss tangent. Further, in the aforementioned case, hysteresis loss of a tread portion increased as a result of an increase in rigidity of a sidewall portion.

Accordingly, the outermost end in the tire radial direction of a bead filler needs to be positioned either at the same height in the tire radial direction as the outermost end in the tire width direction of the rim guard or on the inner side in the tire radial direction than the outermost end in the tire width direction of the rim guard in order to avoid such increases in hysteresis loss in the bead filler and the tread portion as described above.

However, when the outermost end in the tire radial direction of the bead filler was positioned in such a manner as described above, the bead filler itself has a reduced size and therefore the tire provided with the conventional rim guard having a relatively large volume, i.e. the rim guard where a contour of a radially outer side portion thereof has radius of curvature exceeding 40 mm, experienced an increase in magnitude of deformation of the rim guard by deformation force in the tire width direction and thus an increase in hysteresis loss in the rim guard.

Further, in this case, the increase in hysteresis loss in the rim guard portion overwhelmed the suppression of hysteresis loss in the bead filler and the tread portion, whereby rolling resistance of the tire as a whole increased after all.

In view of this, the inventors of the present invention attempted modifying the conventional pneumatic tire described above by adequately adjusting the position of the outermost end in the tire radial direction of the bead filler relative to the position of the outermost end in the tire width direction of the rim guard and specifying a range of radius of curvature of a contour of a radially outer side portion of the rim guard, thereby completing the present invention.

Specifically, primary structures of the present invention are as follows. A pneumatic tire of the present invention is characterized in that it comprises:

a carcass constituted of at least one ply and provided in a toroidal shape across a pair of bead cores of the tire so that the carcass is engaged with and held by the bead cores;

a bead filler provided on the outer side in the tire radial direction of each bead core; and a rim guard provided on the outer side in the tire radial direction than a rim-tire separation point to protrude on the outer side in the tire width direction, the rim-tire separation point being a point at which the tire separates from a prescribed rim in a state where the tire is assembled with the prescribed rim and inflated at predetermined air pressure with no load thereon, wherein a contour of a portion of the rim guard on the outer side in the tire radial direction than the outermost end in the tire width direction of the rim guard (which portion will be referred to as a "radially outer side portion of the rim guard" hereinafter) has radius of curvature in the range of 5 mm to 40 mm in a cross section in the tire width direction of the tire, and provided that "1CSH" represents a distance in the tire radial direction between the innermost end and the outermost end in the tire radial direction of the carcass, "positive direction" represents a direction on the outer side in the tire radial direction from the outermost end in the tire width direction of the rim guard as a reference point, and "negative direction" represents a direction on the inner side in the tire radial direction from the reference point, a distance in the tire radial direction measured from the outermost end in the tire width direction of the rim guard to the outermost end in the tire radial direction of a bead filler (which distance may be referred to as a "rim guard widthwise outermost end-bead filler radial outermost end distance" hereinafter) is in the range of −0.2CSH to 0.05CSH.

In the case of a conventional tire having a rim guard where a contour of a radially outer side portion thereof has radius of curvature exceeding 40 mm, the following phenomena will occur.

Specifically, in the conventional tire, it is possible to decrease a volume of a bead filler generally having high loss tangent and thus suppress hysteresis loss in the bead filler by positioning the outermost end in the tire radial direction of the bead filler so as to be within the aforementioned range, i.e. −0.2CSH to 0.05CSH, relative to the outermost end in the tire width direction of the rim guard. Further, in this case, it is possible to suppress deformation of a tread portion and thus hysteresis loss in the tread portion because rigidity of sidewall portions is suppressed. However, on the other hand, a magnitude of deformation of the rim guard caused by deformation force exerted in the tire width direction increases, thereby significantly increasing hysteresis loss in the rim guard having a relatively large volume. In the conventional tire, the increase in hysteresis loss in the rim guard overwhelms the suppression of hysteresis loss in the bead filler and the tread portion because the rim guard thereof having the aforementioned radius of curvature indeed has a relatively large volume.

Accordingly, rolling resistance of the tire as a whole tends to increase after all in the conventional tire.

In contrast, in the pneumatic tire of the present invention in which radius of curvature of a contour of the radially outer side portion of the rim guard is set to be in the range of 5 mm to 40 mm, the following phenomena will occur by positioning the outermost end in the tire radial direction of the bead filler so as to be within the aforementioned range, i.e. −0.2CSH to 0.05CSH, relative to the outermost end in the tire width direction of the rim guard.

Specifically, as a result of setting radius of curvature of the rim guard to be in the range of 5 mm to 40 mm, the rim guard itself has a reduced size and is susceptible to deformation by deformation force exerted in the tire width direction, as compared with the conventional tire provided with a rim guard having a relatively large volume. However, hysteresis loss in the rim guard is likely to decrease because of a decrease in volume of the rim guard. An effect caused by a decrease in volume of the rim guard actually exceeds an effect caused by facilitated deformation of the rim guard, whereby an increase in hysteresis loss in the rim guard is suppressed in the tire of the present invention. Further, the more facilitated deformation of the rim guard by deformation force exerted in the tire width direction in turn results in the more mitigated deformation of the bead filler, whereby hysteresis loss in the bead filler further decreases.

Accordingly, in the tire of the present invention, it is possible to suppress the hysteresis loss in the tire as a whole including the bead filler, the tread portion and the rim guard, thereby reducing rolling resistance of the tire as a whole.

As described above, it is possible to reduce rolling resistance of a tire, while ensuring a good effect of protecting a rim by a rim guard thereof, by setting radius of curvature of a contour of a radially outer side portion of the rim guard to be in the range of 5 mm to 40 mm.

Further, it is possible to reduce rolling resistance of the tire as a whole, while ensuring a good effect of protecting the rim by the rim guard thereof, by positioning the outermost end in the tire radial direction of the bead filler so as to be in the range of −0.2CSH to 0.05CSH, relative to the outermost end in the tire width direction of the rim guard. In the present invention, "the outermost end in the tire width direction of a rim guard" represents a point positioned on the outermost side in the tire width direction in the rim guard in a cross section in the tire width direction thereof. If a plurality of such points as described above exist in the rim guard, the outermost point in the tire radial direction among those points should represent "the outermost end in the tire width direction" of the rim guard.

Further, radius of curvature of "a contour of a portion of a rim guard on the outer side in the tire radial direction than the outermost end in the tire width direction of the rim guard (i.e. a contour of a radially outer side portion of a rim guard) represents radius of curvature of a contour sub-portion between the outermost end in the tire width direction of the rim guard and the inflection point closest thereto in a contour defined from the outermost end in the tire width direction of the rim guard toward the outer side in the tire radial direction of the rim guard along the radially outer side portion of the rim guard (in a case where the contour has only a single radius curvature, the single radius curvature represents the radius of curvature of the contour).

Yet further, dimensions of the pneumatic tire of the present invention represent those measured in a state where the tire has been assembled with a prescribed rim and inflated at predetermined air pressure with no load thereon. In this connection, a "prescribed rim" represents a rim prescribed by an industrial standard which is valid in an area where the tire is manufactured and used. Examples of the industrial standard include: JATMA (The Japan Automobile Tyre Manufacturers Association, Inc.) YEAR BOOK in Japan; ETRTO (European Tyre and Rim Technical Organisation) STANDARD MANUAL in Europe; TRA (THE TIRE and RIM ASSOCIATION INC.) YEAR BOOK in the United States; and the like. "Predetermined air pressure"

represents air pressure (the maximum air pressure) corresponding to predetermined load exerted on a tire of each prescribed size.

In the pneumatic tire of the present invention, the contour of the radially outer side portion of the rim guard preferably has radius of curvature in the range of 5 mm to 15 mm (in a cross section in the tire width direction of the tire).

It is possible to further reduce rolling resistance of the tire as a whole, while ensuring a good effect of protecting the rim by the rim guard thereof, by setting radius of curvature of the contour of the radially outer side portion of the rim guard to be in the range of 5 mm to 15 mm.

Advantageous Effect of the Invention

According to the pneumatic tire of the present invention, it is possible to reduce rolling resistance of a tire, while ensuring a good effect of protecting a rim by a rim guard thereof.

DESCRIPTION OF THE EMBODIMENTS

Figure 1:
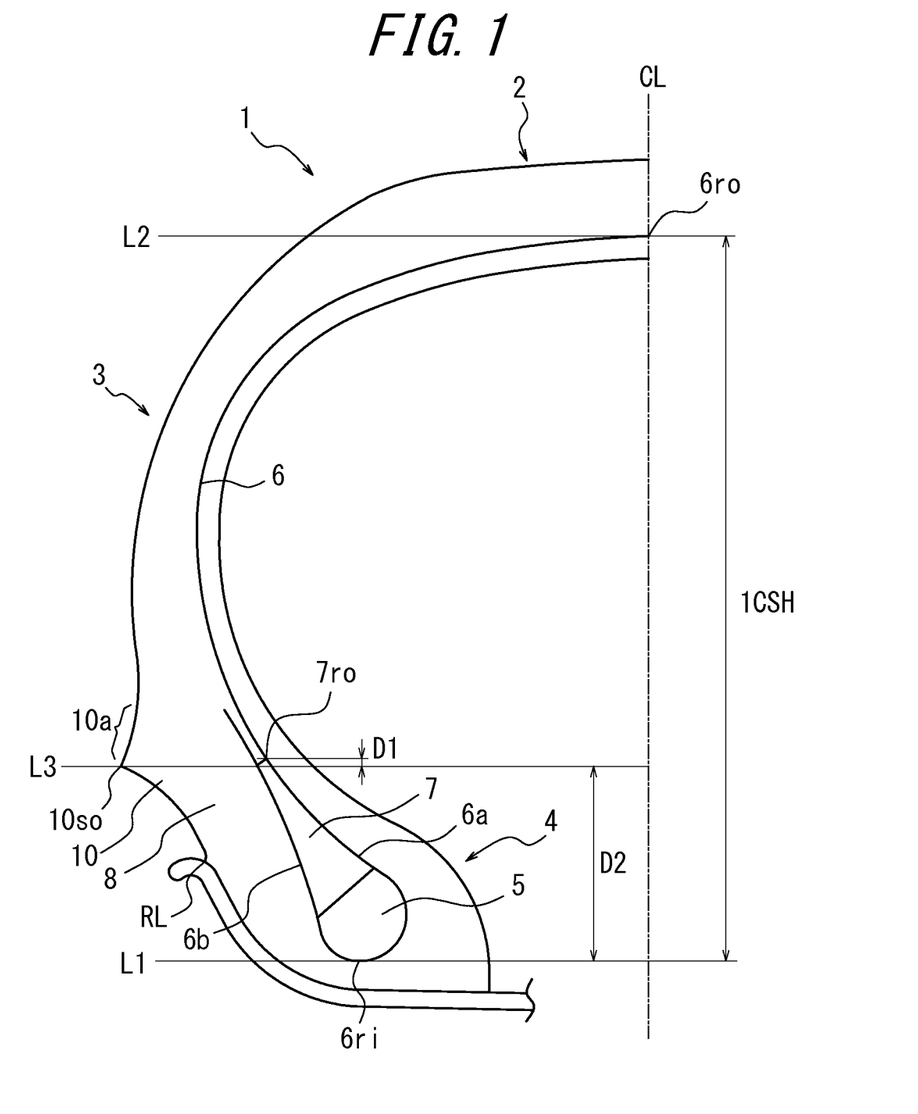
FIG. 1 is a cross sectional view in the tire width direction of a half portion of a pneumatic tire according to one example of the present invention in a state where the tire has been assembled with a prescribed rim.

FIG. 1 shows a cross sectional view in the tire width direction of a half portion of a pneumatic tire 1 according to one example of the present invention in a state where the tire has been assembled with a prescribed rim. The pneumatic tire 1 has a tread portion 2, a pair of sidewall portions 3 extending from respective side portions of the tread portion 2 toward the inner side in the tire radial direction (only a portion of one sidewall is shown in the drawing), and a pair of bead portions 4 extending from the respective sidewall portions 3 toward the inner side in the tire radial direction (only the bead portion on one side is shown in the drawing).

Further, the pneumatic tire 1 has a pair of bead cores 5 embedded in the respective bead portions 4 (only the bead core on one side is shown in FIG. 1) and a radial carcass 6 constituted of at least one ply (a single ply in FIG. 1) and provided in a toroidal shape across the pair of bead cores 5 such that the carcass 6 is engaged with and held by the bead cores 5.

The radial carcass 6 of the pneumatic tire 1 according to the one example of the present invention shown in FIG. 1 includes: a carcass main body 6a folded up around the respective bead cores 5 from the inner side toward the outer side in the tire width direction to be engaged with and held by the bead cores 5; and carcass folded-up portions 6b each extending from the carcass main body 6a and folded up around the corresponding bead core 5 from the inner side toward the outer side in the tire width direction. The pneumatic tire of the present invention, however, is not restricted to the structure of the pneumatic tire 1 described above and, for example, the radial carcass 6 may be wound up around the bead cores 5 or folded up around the bead cores 5 from the outer side toward the inner side in the tire width direction.

Further, the radial carcass of the pneumatic tire of the present invention may be constituted of a plurality of plies, according to necessity, although FIG. 1 shows a case where the radial carcass is constituted of a single ply. Yet further, the carcass of the pneumatic tire of the present invention may be a bias carcass, although FIG. 1 shows a case where the carcass is a radial carcass.

The pneumatic tire 1 has a bead filler 7 on the outer side in the tire radial direction of each bead core 5 embedded in the corresponding bead portion 4 in a region between the carcass main body 6a and the carcass folded-up portion 6b so that the bead filler 7 gradually decreases thickness thereof toward the outer side in the tire radial direction along the radial carcass 6. The bead filler 7 has a substantially triangular shape in FIG. 1 and FIG. 2, respectively.

The pneumatic tire 1 further has: a rubber chafer 8 on the outer side in the tire width direction of the carcass folded-up portion 6b; and a rim guard 10 provided on the outer side in the tire radial direction than a rim line position RL set on a surface of the rubber chafer 8 such that the rim guard 10 protrudes on the outer side in the tire width direction and extends continuously in the tire circumferential direction. The rim guard 10 has a substantially triangular shape in FIG. 1 and FIG. 2, respectively.

In this connection, a "rim line position" represents a rim-tire separation point at which the tire separates from a prescribed rim in a state where the tire has been assembled with the prescribed rim and inflated at predetermined air pressure with no load thereon.

Figure 2:
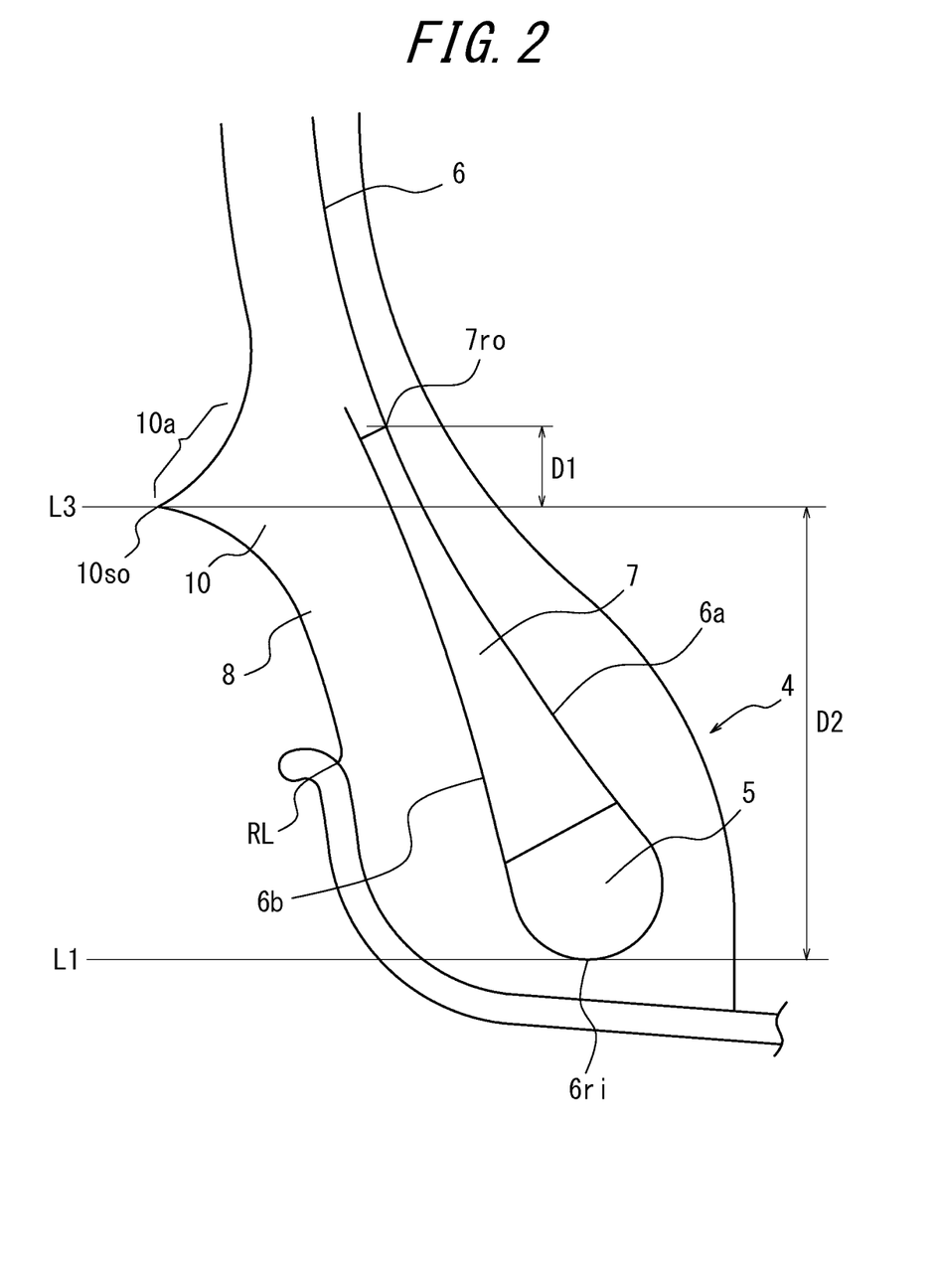
FIG. 2 is a cross sectional view in the tire width direction of the vicinity of a bead portion in the half portion of the pneumatic tire according to the one example of the present invention in a state where the tire has been assembled with a prescribed rim.

FIG. 2 shows a cross sectional view in the tire width direction of the vicinity of the bead portion 4 in a half portion of the pneumatic tire 1 according to the one example of the present invention in a state where the tire has been assembled with a prescribed rim.

In the present embodiment, a contour of a radially outer side portion 10a of the rim guard 10 of the pneumatic tire 1 must have radius of curvature R in the range of 5 mm to 40 mm.

Further, in FIG. 1, provided that "L1" represents an imaginary line in parallel to the rotation axis of the tire and passing through the innermost end 6ri in the tire radial direction of the radial carcass 6 and "L2" represents an imaginary line in parallel to the rotation axis of the tire and passing through the outermost end 6ro in the tire radial direction of the radial carcass 6 (the outermost end 6ro is positioned on the tire equatorial plane CL in FIG. 1), a distance between the imaginary line L1 and the imaginary line L2, i.e. a distance in the tire radial direction measured from the innermost end 6ri in the tire radial direction of the radial carcass 6 to the outermost end 6ro in the tire radial direction of the radial carcass 6, is 1CSH.

Further, provided that "L3" represents an imaginary line in parallel to the rotation axis of the tire and passing through the outermost end 10so in the tire width direction of the rim guard 10, a direction toward the outer side in the tire radial direction from the imaginary line L3 as a reference line in the tire radial direction represents "positive direction" and a direction toward the inner side in the tire radial direction from the imaginary line L3 as the reference line represents "negative direction". Based on this, it is necessary in the pneumatic tire 1 that distance D1 measured from the imaginary line L3 to the outermost end 7ro in the tire radial direction of the bead filler 7 is in the range of −0.2CSH to 0.05CSH. That is, distance D1 in the tire radial direction measured from the outermost end 10so in the tire width direction of the rim guard 10 to the outermost end 7ro in the tire radial direction of the bead filler 7 must be in the range of −0.2CSH to 0.05CSH (FIG. 2 shows a pneumatic tire having D1>0).

In the pneumatic tire 1, the larger radius of curvature R of the contour of the radially outer side portion 10a of the rim guard 10 results in the larger volume of the rim guard portion. The larger volume of the rim guard portion results in the larger hysteresis loss in the rim guard caused by deformation force applied in the tire width direction. Accordingly, the larger radius of curvature R results in the larger hysteresis loss in the rim guard.

In this connection, setting the radius of curvature R to be 40 mm or less can suppress an increase in volume of the radially outer side portion 10a of the rim guard 10 and thus an increase in hysteresis loss in the rim guard, although the radially outer side portion 10a is then made somewhat susceptible to deformation. Further, since the radially outer side portion 10a of the rim guard 10 is made more susceptible to deformation by deformation force in the tire width direction than the bead filler is, hysteresis loss caused by deformation of the radially outer side portion 10a of the rim guard 10 increases and hysteresis loss caused by deformation of the bead filler (which generally has relatively high loss tangent) decreases accordingly. As a result, rolling resistance of the tire as a whole can be reduced.

Further in this connection, setting the radius of curvature R to be 5 mm or larger can ensure a good effect of protecting the rim by the rim guard.

In short, it is possible to reduce rolling resistance of a tire as a whole without adversely affecting a good effect of protecting a rim by a rim guard thereof by setting the radius of curvature R of a radially outer side portion of the rim guard to be within the aforementioned range.

Further, it is possible to ensure satisfactory rigidity of the bead portion on the inner side in the tire radial direction than the outermost end in the tire width direction of the rim guard and thus suppress deformation of the bead portion by setting the distance D1 in the tire radial direction measured from the outermost end 10so in the tire width direction of the rim guard 10 to the outermost end 7ro in the tire radial direction of the bead filler 7 to be −0.2CSH. As a result, hysteresis loss in the bead portion can be reduced.

Yet further, setting D1 to be 0.05CSH avoids an excessive increase in rigidity of the sidewall portion and thus successfully suppresses deformation of the tread portion. As a result, an increase in hysteresis loss in the tread portion can be suppressed. Yet further, the volume of the bead filler and thus hysteresis loss in the bead filler can be decreased when D1 is 0.05CSH, although the bead filler is somewhat more susceptible to deformation caused by deformation force exerted in the tire width direction than the bead filler of the conventional tire. As a result, rolling resistance of the tire as a whole can be suppressed. Mass of the tire as a whole can also be reduced due to a decrease in volume of the bead filler in the pneumatic tire of the present invention.

Radius of curvature R of a contour of the radially outer side portion 10a of the rim guard 10 is preferably set to be in the range of 5 mm to 15 mm in the pneumatic tire 1.

A good effect can be obtained by setting the radius of curvature R to be 5 mm or larger, as described above.

Setting the radius of curvature R to be 15 mm or less can further suppress an increase in volume of the radially outer side portion 10a of the rim guard 10 and thus further suppress an increase in hysteresis loss in the rim guard.

Further, hysteresis loss caused by deformation of the bead filler (having relatively high loss tangent) decreases accordingly by an increase in hysteresis loss caused by deformation of the radially outer side portion 10a of the rim guard 10. As a result, rolling resistance of the tire as a whole can be further reduced.

Radius of curvature R of a contour of the radially outer side portion 10a of the rim guard 10 is further preferably set to be in the range of 5 mm to 10 mm in the pneumatic tire 1 for the same reasons described above.

It is further preferable in the pneumatic tire 1 to set the distance D1 in the tire radial direction measured from the outermost end 10so in the tire width direction of the rim guard 10, as the reference point, to the outermost end 7ro in the tire radial direction of the bead filler 7 to be in the range of −0.1CSH to 0.05CSH for the same reasons described above.

In the pneumatic tire 1, It is preferable to set a distance between the imaginary line L1 and the outermost end 10so in the tire width direction of the rim guard 10, i.e. distance D2 in the tire radial direction measured from the innermost end 6ri in the tire radial direction of the radial carcass 6 to the outermost end 10so in the tire width direction of the rim guard 10, to be in the range of 0.25CSH to 0.50CSH.

It is possible to ensure a sufficient distance in the width direction between the rim and the outermost end 10so in the tire width direction of the rim guard 10 and thus a good effect of protecting the rim by setting the distance D2 in the tire radial direction measured from the innermost end 6ri in the tire radial direction of the radial carcass 6 to the outermost end 10so in the tire width direction of the rim guard 10 to be 0.25CSH. Further, it is possible to suppress an increase in volume of the bead filler and thus reduce rolling resistance of the tire by setting D2 to be 0.50CSH.

The rim guard 10 has a substantially triangular configuration in the pneumatic tire 1 shown in FIG. 2. However, the pneumatic tire of the present invention is not restricted to such a structure and the rim guard of the tire may have a trapezoidal configuration, a trapezoidal configuration with rounded apexes, and the like in a cross section in the tire width direction thereof. The rim guard may have a plurality of protruding portions.

Elastic modulus of the bead filler ($E_B$) applicable to the pneumatic tire of the present invention is preferably in the range of 200% to 3000% of elastic modulus of the rim guard ($E_R$).

Elastic modulus ($E_B$) of the bead filler ≥200% of elastic modulus ($E_R$) of the rim guard ensures satisfactory high rigidity of the bead portion, suppresses deformation of the bead portion, and thus reduces hysteresis loss in the bead portion. Elastic modulus ($E_B$) of the bead filler >3000% of elastic modulus ($E_R$) of the rim guard, however, increases rigidity of the sidewall portion too much, thereby possibly increasing hysteresis loss in the tread portion. It is therefore possible to further reduce rolling resistance of the tire as a whole by setting a ratio of $E_B$ with respect to $E_R$ to be in the aforementioned range.

In this connection, a higher ratio of $E_B$ with respect to $E_R$ within the aforementioned range is more preferable in terms of ensuring satisfactory high rigidity. Accordingly, setting the ratio of $E_B$ with respect to $E_R$ to be in the range of 1000% to 2000% is particularly preferable for the same reasons as described above.

Loss tangent of the bead filler ($\tan \delta_B$) applicable to the pneumatic tire of the present invention is preferably in the range of 0% to 600% (exclusive of 0% and inclusive 600%) of loss tangent of the rim guard ($\tan \delta_R$). Loss tangent (tan $\delta_B$) of the bead filler 600% of loss tangent (tan $\delta_R$) of the rim guard suppresses an excessive increase in hysteresis loss in the bead filler, thereby successfully further reducing rolling resistance of the tire as a whole.

In this connection, a smaller ratio of tan $\delta_B$ with respect to tan $\delta_R$ within the aforementioned range is more preferable in terms of rolling resistance (the smaller tan $\delta_B$ results in the less hysteresis loss). Accordingly, setting the ratio of tan $\delta_B$ with respect to tan $\delta_R$ to be in the range of 20% to 300% is particularly preferable for the same reasons as described above.

The rim guard may be provided in only one of the bead portions in the pneumatic tire of the present invention, although a pair of the rim guards 10 is provided in a pair of the bead portions 4, respectively, in the pneumatic tire 1 according to the one example of the present invention shown in FIG. 1. In this case, an effect equivalent to that of the foregoing embodiment can be obtained by mounting the tire on a vehicle such that the side provided with the rim guard, of the tire, is oriented on the vehicle outer side.

EXAMPLES

The present invention will be described further in detail by Examples hereinafter without being restricted thereto by any means.

Example 1

A pneumatic test tire for Example 1 having the relevant characteristics shown in Table 1 was prepared and the following evaluations were conducted by using the pneumatic test tire thus prepared.

Comparative Example 1

A pneumatic test tire for Comparative Example 1 having the relevant characteristics shown in Table 1 was prepared and the following evaluations were conducted in a manner similar to that of Example 1 by using the pneumatic test tire thus prepared.

(1) Rolling Resistance Test

Each of the pneumatic test tires (225/45R17) was assembled with a prescribed rim (7.5 J) prescribed by JATMA's tire standards, whereby a pneumatic tire-rim assembly was prepared. The pneumatic test tire thus assembled with the rim was mounted on a vehicle under the conditions of internal pressure: 230 kPa and load: 4.5 t and subjected to a rolling resistance test described below.

Rolling resistance was determined for evaluation, by running the aforementioned pneumatic test tire on an iron drum surface (diameter: 1.7 m) of a drum tester at 80 km/hour, then allowing the vehicle to travel by inertial force, and measuring rolling resistance from deceleration of the tire. More specifically, each rolling resistance value was calculated as an index value relative to the corresponding evaluation result "100" of Comparative Example 1, for evaluation. The evaluation results thus calculated are shown in Table 1. The smaller index value represents the smaller rolling resistance, i.e. the better fuel efficiency.

(2) Measurement of Mass of Tire

The mass of each pneumatic test tire prior to being assembled with a rim was measured. Specifically, the mass value of the tire was calculated as an index value relative to the corresponding evaluation result "100" of Comparative Example 1, for evaluation. The evaluation results thus calculated are shown in Table 1. The smaller index value represents the better effect of reducing tire weight.

(3) Rim Protection Performance Test

Each of the pneumatic test tires was assembled with a prescribed rim (7.5 J) prescribed by JATMA's tire standards, whereby a pneumatic tire-rim assembly was prepared. The pneumatic test tire thus assembled with the rim was then subjected to a rim protection performance test in a state where the tire was not inflated (i.e. at internal pressure: 0 kPa) to simulate a situation in which the tire-rim assembly is stored.

Figure 3:
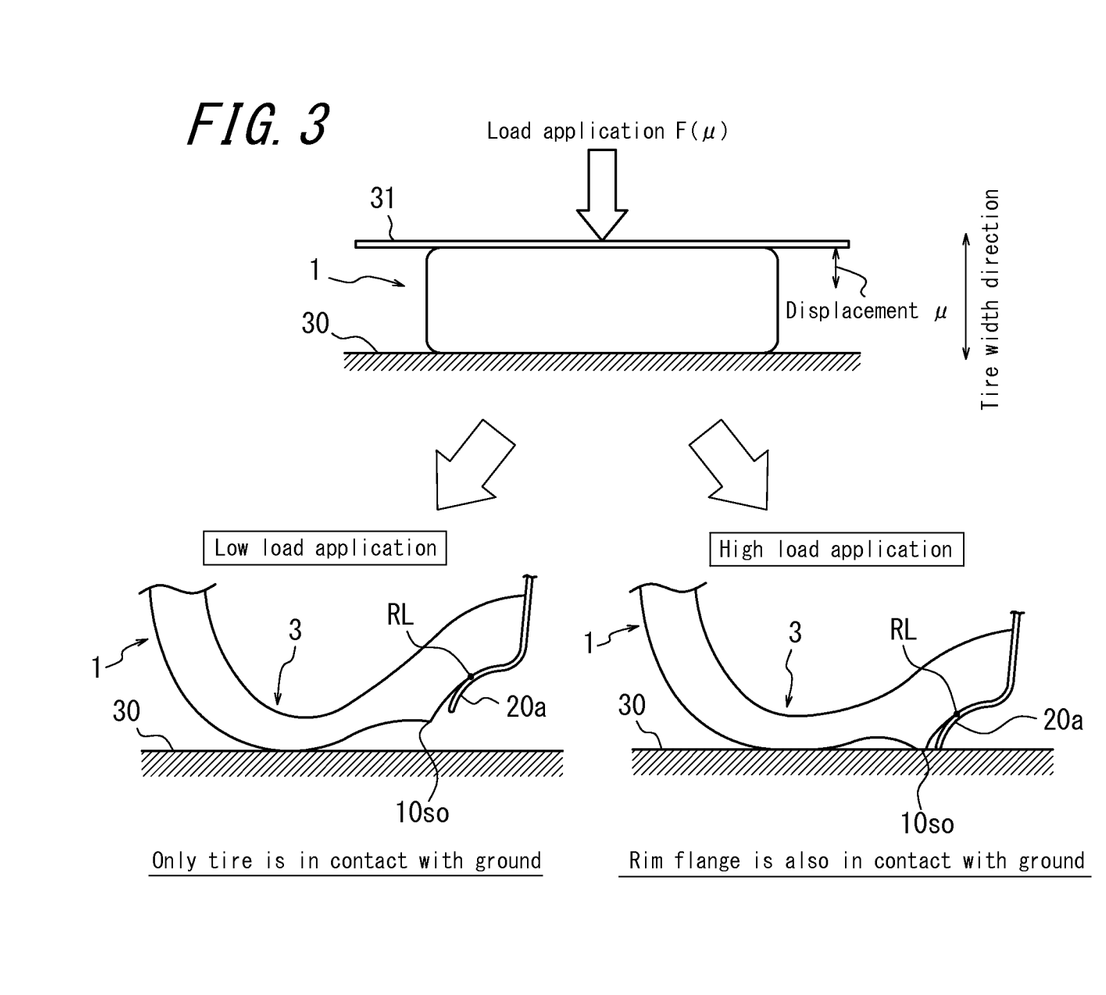
FIG. 3 is a diagram showing a scheme of a testing method of a rim protection performance test carried out for the pneumatic tire according to the one example of the present invention.

FIG. 3 shows a scheme of a testing method of a rim protection performance test. Rim protection performance was determined by: putting each pneumatic test tire (e.g. the pneumatic tire 1 according to the one example of the present invention) down sideways in an Amsler testing machine such that one side surface of the tire faced a flat plate 30; putting an iron plate 31 on the other side surface of the tire; applying load on the tire from the iron plate 31 side toward the flat plate 30 side; and calculating energy required for a rim flange 20_a_ of a rim 20 mounted with the tire on the flat plate 30 side to be brought into contact with the flat plate 30. Specifically, the rim protection performance value of the tire was calculated as an index value relative to the corresponding evaluation result "100" of Comparative Example 1, for evaluation. The evaluation results thus calculated are shown in Table 1. The larger index value represents the better effect of rim protection.

Comparative Example 2

Pneumatic test tires for Comparative Example 2 having the relevant characteristics shown in Table 1 was prepared. The running performances were then evaluated for Comparative Example 2 in a manner similar to that of Example 1.

TABLE 1

|  |  | Comparative Example 1 | Comparative Example 2 | Example 1 |
|---|---|---|---|---|
| Characteristics of tire | Configuration of rim guard | Triangular | Triangular | Triangular |
|  | Radius of curvature R of contour of radially outer side portion of rim guard (mm) | 50 | 50 | 8 |
|  | Distance D1 in tire radial direction measured from the outermost end in tire width direction of rim guard to the outermost end in tire radial direction of bead filler (CSH) | 0.25 | 0 | 0 |
|  | Distance D2 in tire radial direction measured from the innermost end in tire radial direction of carcass to the outermost end in tire width direction of rim guard (CSH) | 0.3 | 0.3 | 0.3 |

TABLE 1-continued

|  |  | Comparative Example 1 | Comparative Example 2 | Example 1 |
|---|---|---|---|---|
|  | Elastic modulus of bead filler/Elasitc modulus of rim guard $E_B/E_R$ [%] | 1500 | 1500 | 1500 |
|  | Loss tangent of bead filler/loss tangent of rim guard $tan\delta_B/tan\delta_R$ [%] | 150 | 150 | 150 |
| Performances | Rolling resistance index | 100 | 102 | 93 |
|  | Mass index | 100 | 98 | 95 |
|  | Rim protection performance index | 100 | 100 | 100 |

It is understood from comparison of Examples 1 with Comparative Example 2 that it is possible to obtain the effect of the present invention, i.e. reduce rolling resistance of a tire, while ensuring a good effect of protecting a rim by a rim guard thereof, by setting radius of curvature R of a contour of the radially outer side portion of the rim guard to be in the range of 5 mm to 40 mm and setting the distance D1 to be in the range of −0.2CSH to 0.05CSH. It is also understood from comparison of Examples 3 to 5 with Examples 1, 2, 6 and 7 that it is possible to further reduce rolling resistance of the tire as a whole, while ensuring a good effect of protecting the rim by the rim guard thereof, by setting the radius of curvature R to be in the range of 5 mm to 15 mm in particular.

INDUSTRIAL APPLICABILITY

According to pneumatic tire of the present invention, it is possible to reduce rolling resistance of a tire, while ensuring a good effect of protecting a rim by a rim guard thereof.

REFERENCE SIGNS LIST

1 Pneumatic tire
2 Tread portion
3 Sidewall portion
4 Bead portion
5 Bead core
6 Carcass
6a Carcass main body
6b Carcass folded-up portion
6ri The innermost end in tire radial direction of carcass
6ro The outermost end in tire radial direction of carcass
7 Bead filler
7ro The outermost end in tire radial direction of bead filler
8 Rubber chafer
10 Rim guard
10a Radially outer side portion of rim guard
10so The outermost end in tire width direction of rim guard
20 Rim
20a Rim flange
30 Flat plate
31 Iron plate
CL Tire equatorial plane
D1 Distance in tire radial direction measured from the outermost end in tire width direction of rim guard to the outermost end in tire radial direction of bead filler
D2 Distance in tire radial direction measured from the innermost end in tire radial direction of carcass to the outermost end in tire width direction of rim guard
L1 Imaginary line in parallel to rotation axis of tire and passing through the innermost end in tire radial direction of carcass
L2 Imaginary line in parallel to rotation axis of tire and passing through the outermost end in tire radial direction of carcass
L3 Imaginary line in parallel to rotation axis direction of tire and passing through the outermost end in tire width direction of rim guard
R Radius of curvature of contour of radially outer side portion of rim guard
RL Rim line position

The invention claimed is:

1. A pneumatic tire, comprising:
a carcass constituted of at least one ply and provided in a toroidal shape across a pair of bead cores of the tire so that the carcass is engaged with and held by the bead cores;
a bead filler provided on the outer side in the tire radial direction of each bead core; and
a rim guard provided on the outer side in the tire radial direction than a rim-tire separation point, the rim-tire separation point being a point at which the tire separates from a prescribed rim in a state where the tire is assembled with the prescribed rim and inflated at predetermined air pressure with no load thereon, and
a pair of sidewall portions the outer surface of which is on the outer side in the tire width direction than the rim-tire separation point,
wherein a contour of a portion of the rim guard on the outer side in the tire radial direction than the outermost end in the tire width direction of the rim guard has radius of curvature in the range of 5 mm to 10 mm in a cross section in the tire width direction of the tire, provided that "1CSH" represents a distance in the tire radial direction between the innermost end and the outermost end in the tire radial direction of the carcass, "positive direction" represents a direction on the outer side in the tire radial direction from the outermost end in the tire width direction of the rim guard as a reference point, and "negative direction" represents a direction on the inner side in the tire radial direction from the reference point, a distance in the tire radial direction measured from the outermost end in the tire width direction of the rim guard to the outermost end in the tire radial direction of a bead filler is in the range of −0.2CSH to 0.05CSH, and
the rim guard has a triangular configuration in a cross sectional view in the tire width direction.

2. The pneumatic tire of claim 1, wherein elastic modulus of the bead filler ($E_B$) is in the range of 200% to 3000% of elastic modulus of the rim guard ($E_R$).

3. The pneumatic tire of claim 1, wherein distance D2, which is a distance between an imaginary line L 1 in parallel to the rotation axis of the tire and passing through the innermost end in the tire radial direction of the radial carcass and the outermost end in the tire width direction of the rim guard, is in the range of 0.25CSH to 0.50CSH.

4. The pneumatic tire of claim 1,
wherein elastic modulus of the bead filler ($E_B$) is in the range of 200% to 3000% of elastic modulus of the rim guard ($E_R$), and
wherein distance D2, which is a distance between an imaginary line L1 in parallel to the rotation axis of the tire and passing through the innermost end in the tire radial direction of the radial carcass and the outermost end in the tire width direction of the rim guard, is in the range of 0.25CSH to 0.50CSH.

5. The pneumatic tire of claim 1,
the radius of curvature is in the range of 5 mm to ;8 mm in a cross section in the tire width direction of the tire.

* * * * *